(12) United States Patent
Tang et al.

(10) Patent No.: US 11,567,382 B2
(45) Date of Patent: Jan. 31, 2023

(54) TERMINAL WITH A COLOR CHANGING SCREEN LAYER

(71) Applicant: HUAWEI TECHNOLOGIES CO., LTD., Guangdong (CN)

(72) Inventors: Zhongzhi Tang, Shenzhen (CN); Zhen He, Dongguan (CN); Ming Cai, Dongguan (CN); Heshuai Si, Dongguan (CN); Banghong Hu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/477,686

(22) Filed: Sep. 17, 2021

(65) Prior Publication Data

US 2022/0004034 A1    Jan. 6, 2022

Related U.S. Application Data

(63) Continuation of application No. PCT/CN2020/079852, filed on Mar. 18, 2020.

(30) Foreign Application Priority Data

Mar. 20, 2019   (CN) .......................... 201920353704.5

(51) Int. Cl.
*G02F 1/137* (2006.01)
*G02F 1/1333* (2006.01)
(Continued)

(52) U.S. Cl.
CPC .......... *G02F 1/137* (2013.01); *G02F 1/13338* (2013.01); *G02F 1/155* (2013.01);
(Continued)

(58) Field of Classification Search
CPC ...... G02F 1/137; G02F 1/13338; G02F 1/155; G02F 1/163; G02F 2201/44; G02F 2202/14; G02F 2202/28
(Continued)

(56) References Cited

U.S. PATENT DOCUMENTS

2019/0156094 A1*  5/2019  Du ..................... G06V 40/1318

FOREIGN PATENT DOCUMENTS

CN    204178653 U    2/2015
CN    204314582 U    5/2015
(Continued)

OTHER PUBLICATIONS

International Search Report issued in PCT/CN2020/079852, dated Jun. 28, 2020, 6 pages.
(Continued)

*Primary Examiner* — Edward J Glick
*Assistant Examiner* — William D Peterson (57) ABSTRACT

A terminal is provided, and the terminal includes a housing, a front screen, a circuit board, and a power supply. The front screen is disposed on the housing, both the circuit board and the power supply are disposed inside the housing, and the power supply is connected to the circuit board. The front screen includes a toughened glass, a color changing layer, and a display screen that are sequentially stacked. The color changing layer is connected to the circuit board, and can change a color when receiving power supply. The color changing layer is disposed in the front screen, and may change a color when receiving the power supply from the circuit board. The color changing layer is configured to change only a color and cannot display a complex image, and power consumption of the color changing layer is far less than that of the display screen.

19 Claims, 8 Drawing Sheets

(51) Int. Cl.
  *G02F 1/155*   (2006.01)
  *G02F 1/163*   (2006.01)
(52) U.S. Cl.
  CPC .......... *G02F 1/163* (2013.01); *G02F 2201/44* (2013.01); *G02F 2202/14* (2013.01); *G02F 2202/28* (2013.01)
(58) Field of Classification Search
  USPC ........................................................ 349/139
  See application file for complete search history.

(56) References Cited

FOREIGN PATENT DOCUMENTS

| | | | | |
|---|---|---|---|---|
| CN | 204631404 U | 9/2015 | | |
| CN | 107770308 A | 3/2018 | | |
| CN | 107818732 A | 3/2018 | | |
| CN | 107945682 A | 4/2018 | | |
| CN | 304672214 S | 6/2018 | | |
| CN | 304757900 S | 8/2018 | | |
| CN | 109116656 A | 1/2019 | | |
| CN | 109459902 A | * 3/2019 | ............. | G02F 1/163 |
| CN | 109459902 A | 3/2019 | | |
| CN | 208819534 U | 5/2019 | | |
| CN | 208953851 U | 6/2019 | | |
| CN | 209784854 U | 12/2019 | | |
| JP | 2001174939 A | 6/2001 | | |

OTHER PUBLICATIONS

Extended European Search Report issued in EP20773741, dated Jul. 21, 2022, 10 pages.

* cited by examiner

TERMINAL WITH A COLOR CHANGING SCREEN LAYER

CROSS-REFERENCE TO RELATED APPLICATIONS

This application is a continuation of International Application No. PCT/CN2020/079852, filed on Mar. 18, 2020, which claims priority to Chinese Patent Application No. 201920353704.5, filed on Mar. 20, 2019. The disclosures of the aforementioned applications are hereby incorporated by reference in their entireties.

TECHNICAL FIELD

Embodiments of this application relate to the field of terminal technologies, and more specifically, to a terminal with a color changing screen layer.

BACKGROUND

Currently, as technologies develop, front screens are disposed on more terminals. For example, front screens are disposed on all terminals such as a smartphone, a tablet computer, a notebook computer, a smart television, and a smartwatch. An external structure of a terminal mainly includes a housing and a front screen disposed on the housing. In consideration of appearance consistency, designing a terminal on which a color of a front screen is the same as that of a housing has become one of future development directions.

When power consumption is not considered, it can be implemented that a color of a front screen is the same as that of a housing by using a current technology. For example, assuming that a housing of a terminal is red, a processor of the terminal may send a control instruction to a front screen when the terminal is in a standby state, where the control instruction is used to instruct the front screen to display a red color. When the front screen receives the control instruction, the front screen displays the red color.

In the foregoing technical solution, when the terminal is in the standby state, the front screen needs to be always in a running state and display a target color, so that the color of the front screen is consistent with that of the housing. However, in the foregoing technical solution, the front screen consumes a large amount of electric energy when the terminal is in the standby state, thereby reducing service duration of the terminal.

SUMMARY

Embodiments of this application provide a terminal, so that a front screen of the terminal displays a target color while consuming less power.

The embodiments of this application are implemented as follows:

According to a first aspect, an embodiment of this application provides a terminal. The terminal includes a housing, a front screen, a circuit board, and a power supply. The front screen is disposed on the housing, both the circuit board and the power supply are disposed inside the housing, and the power supply is electrically connected to the circuit board. The front screen includes a toughened glass, a color changing layer, and a display screen that are sequentially stacked. The color changing layer is electrically connected to the circuit board, and is configured to change a color when receiving power supply from the circuit board.

In the first aspect, the color changing layer is disposed in the front screen, and the color changing layer may change a color when receiving power supply from the circuit board. The color changing layer is configured only to change a color and cannot display a complex image, and power consumption of the color changing layer is far less than that of the display screen. Therefore, in the terminal provided in the embodiments of this application, the front screen of the terminal can display a target color while consuming less power.

In a possible implementation, the color changing layer is an electrochromic combination layer. The electrochromic combination layer includes a first transparent conducting layer, an ion storage layer, an ion conductor layer, an electrochromic layer, and a second transparent conducting layer that are sequentially stacked. Both the first transparent conducting layer and the second transparent conducting layer are electrically connected to the circuit board.

An initial state of the electrochromic layer is a transparent state. When the first transparent conducting layer receives a voltage, a first ion stored at the ion storage layer enters the electrochromic layer through the ion conductor layer. When the electrochromic layer receives the first ion, the electrochromic layer switches from the transparent state to the target color. When the electrochromic layer is in the target color and the first transparent conducting layer receives no voltage, the electrochromic layer remains in the target color. When the electrochromic layer is in the target color and the second transparent conducting layer receives a voltage, the first ion at the electrochromic layer returns to the ion storage layer through the ion conductor layer, and the electrochromic layer switches from the target color to the transparent state. When the electrochromic layer is in the transparent state and neither the first transparent conducting layer nor the second transparent conducting layer receives a voltage, the electrochromic layer remains in the transparent state. As can be learned from a working principle of the electrochromic combination layer, the electrochromic layer can display the target color while consuming less power, and can further restore to the transparent state while consuming less power.

In a possible implementation, the front screen further includes a silicon dioxide layer, an optical adhesive layer, and a touch control board. The first transparent conducting layer of the electrochromic combination layer is fastened on the toughened glass. A first surface of the silicon dioxide layer is fastened on the second transparent conducting layer of the electrochromic combination layer. A second surface of the silicon dioxide layer is bonded to a first surface of the display screen by using the optical adhesive layer. A second surface of the display screen is attached to the touch control board.

The silicon dioxide layer may perform an insulation function. When a voltage is applied to the electrochromic combination layer, the silicon dioxide layer can prevent a current on the electrochromic combination layer from entering the display screen and the touch control board. In addition, the silicon dioxide layer and the optical adhesive layer have better bonding performance.

In a possible implementation, a thickness of the electrochromic combination layer is less than or equal to 10 micrometers.

To prevent an overall thickness of the front screen from being excessively large, the thickness of the electrochromic combination layer may be controlled within 10 micrometers.

In a possible implementation, the color changing layer is a monochrome conversion liquid crystal layer. The front screen further includes a first optical adhesive layer, a second optical adhesive layer, and a touch control board. A first surface of the monochrome conversion liquid crystal layer is bonded to the toughened glass by using the first optical adhesive layer. A second surface of the monochrome conversion liquid crystal layer is bonded to a first surface of the display screen by using the second optical adhesive layer. A second surface of the display screen is attached to the touch control board.

When the monochrome conversion liquid crystal layer receives no voltage, the monochrome conversion liquid crystal layer is in the transparent state. When the monochrome conversion liquid crystal layer receives a voltage, the monochrome conversion liquid crystal layer switches from the transparent state to the target color. As can be learned from a working principle of the monochrome conversion liquid crystal layer, the monochrome conversion liquid crystal layer can switch only between the target color and the transparent state. Because the color to be displayed by the monochrome conversion liquid crystal layer is a single color, the monochrome conversion liquid crystal layer consumes less power, and the monochrome conversion liquid crystal layer can display the target color while consuming less power, and can further restore to the transparent state while consuming no power.

In a possible implementation, a thickness of the monochrome conversion liquid crystal layer is less than or equal to 0.1 millimeters.

To prevent an overall thickness of the front screen from being excessively large, the thickness of the monochrome conversion liquid crystal layer may be controlled within 0.1 millimeters.

According to a second aspect, an embodiment of this application provides a terminal. The terminal includes a housing and a front screen. The front screen is disposed on the housing. The front screen includes a toughened glass, a photochromic layer, and a display screen that are sequentially stacked. Light emitted by the display screen is irradiated onto the photochromic layer, and the photochromic layer is configured to change a color when receiving the light emitted by the display screen.

According to the second aspect, when the photochromic layer receives no light emitted by the display screen, the photochromic layer is in a target color. When the photochromic layer is in the target color and the photochromic layer receives the light emitted by the display screen, the photochromic layer switches from the target color to a transparent state. As can be learned from a working principle of the photochromic layer, when the photochromic layer receives the light emitted by the display screen, the photochromic layer may switch from the transparent state to the target color. In addition, when the photochromic layer receives no light emitted by the display screen, the photochromic layer may switch from the target color to the transparent state. In a process of switching between the transparent state and the target color, the photochromic layer consumes no power.

In a possible implementation, the front screen further includes an optical adhesive layer and a touch control board. A first surface of the photochromic layer is fastened on the toughened glass. A second surface of the photochromic layer is bonded to a first surface of the display screen by using the optical adhesive layer. A second surface of the display screen is attached to the touch control board.

In a possible implementation, a thickness of the photochromic layer is less than or equal to 0.05 millimeters.

To prevent an overall thickness of the front screen from being excessively large, the thickness of the photochromic layer may be controlled within 0.05 millimeters.

In a possible implementation, the photochromic layer comprises a photosensitive material.

DESCRIPTION OF EMBODIMENTS

The following describes the technical solutions in the embodiments of this application with reference to the accompanying drawings in the embodiments of this application.

Figure 1:
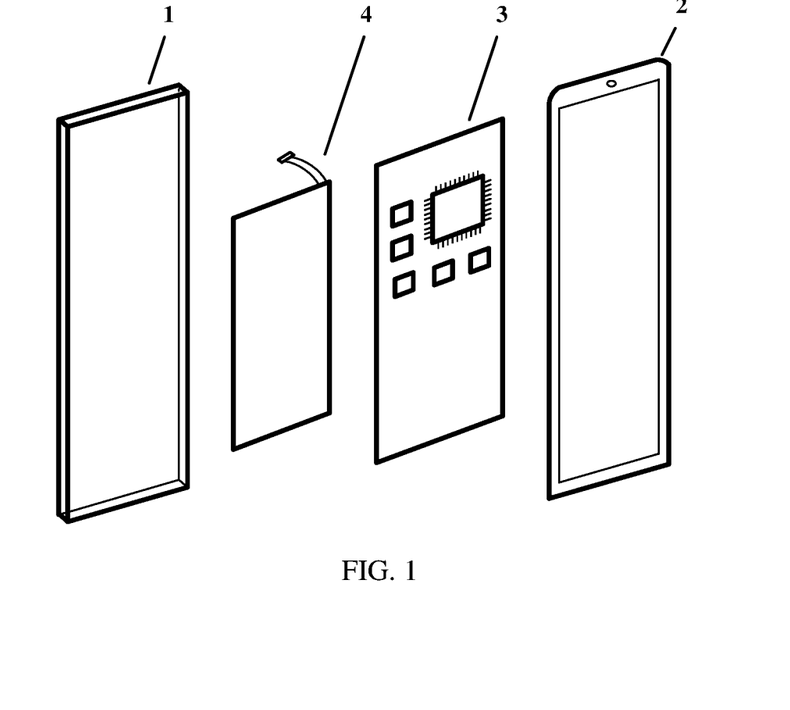
FIG. 1 is a schematic diagram of a terminal according to an embodiment of this application.

FIG. 1 is a schematic diagram of a terminal according to an embodiment of this application. In the embodiment shown in FIG. 1, the terminal includes a housing 1, a front screen 2, a circuit board 3, and a power supply 4. The front screen 2 is disposed on the housing 1, both the circuit board 3 and the power supply 4 are disposed inside the housing 1, and the power supply 4 is electrically connected to the circuit board 3.

Figure 2:
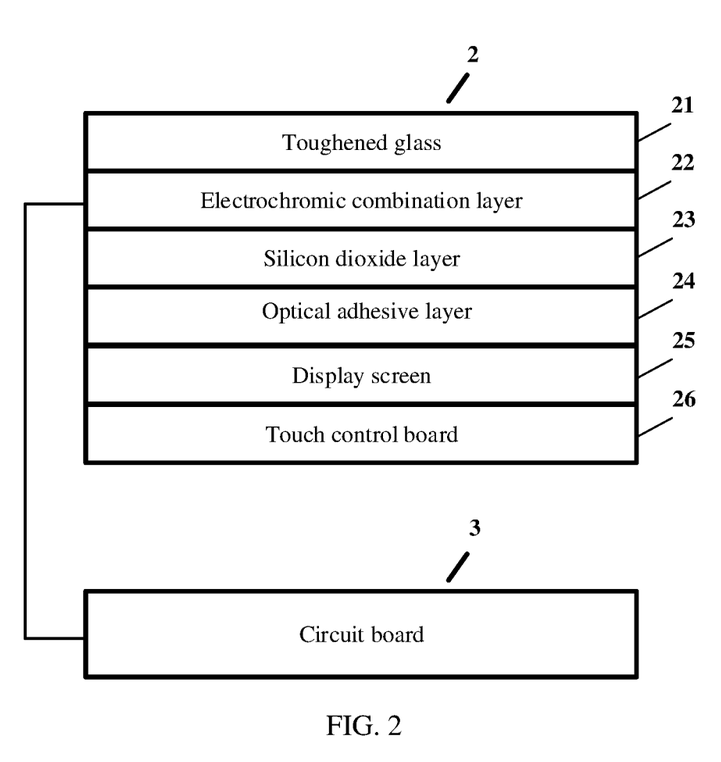
FIG. 2 is a schematic diagram of a front screen according to an embodiment of this application.

FIG. 2 is a schematic diagram of a front screen according to an embodiment of this application. In the embodiments shown in FIG. 1 and FIG. 2, the front screen 2 includes a toughened glass 21, an electrochromic combination layer 22, a silicon dioxide layer 23, an optical adhesive layer 24, a display screen 25, and a touch control board 26 that are sequentially stacked. The electrochromic combination layer 22 is electrically connected to the circuit board 3, and is configured to change a color when receiving power supply from the circuit board 3.

In the embodiments shown in FIG. 1 and FIG. 2, the toughened glass 21 can increase strength of the front screen, to protect security of the electrochromic combination layer 22, the display screen 25, and the touch control board 26. The electrochromic combination layer 22 may switch between a transparent state and a target color. The silicon dioxide layer 23 may perform an insulation function. When a voltage is applied to the electrochromic combination layer 22, the silicon dioxide layer 23 can prevent a current on the electrochromic combination layer 22 from entering the display screen 25 and the touch control board 26. In addition, the silicon dioxide layer 23 and the optical adhesive layer 24 have better bonding performance. In addition, the silicon dioxide layer 23 may be disposed on the electrochromic combination layer 22 in a physical vapor deposition manner. The optical adhesive layer 24 may bond the silicon dioxide layer 23 to the display screen 25. The display screen 25 may display an image. The touch control board 26 may receive a touch instruction entered by a user.

In the embodiments shown in FIG. 1 and FIG. 2, to prevent an overall thickness of the front screen 2 from being excessively large, the thickness of the electrochromic combination layer 22 may be controlled within 10 micrometers.

In the embodiments shown in FIG. 1 and FIG. 2, an initial state of the electrochromic combination layer 22 is the transparent state. When a first end of the electrochromic combination layer 22 receives a voltage provided by the circuit board 3, the electrochromic combination layer 22 switches from the transparent state to the target color. When the electrochromic combination layer 22 is in the target color and the electrochromic combination layer 22 receives no voltage provided by the circuit board 3, the electrochromic combination layer 22 remains in the target color. When the electrochromic combination layer 22 is in the target color and a second end of the electrochromic combination layer 22 receives a voltage provided by the circuit board 3, the electrochromic combination layer 22 switches from the target color to the transparent state. When the electrochromic combination layer 22 is in the transparent state and receives no voltage provided by the circuit board 3, the electrochromic combination layer 22 remains in the transparent state. As can be learned from a working principle of the electrochromic combination layer 22, the electrochromic combination layer 22 can display the target color while consuming less power, and can further restore to the transparent state while consuming less power.

In the embodiments shown in FIG. 1 and FIG. 2, the display screen 25 may be a screen such as an LCD or an OLED. LCD is short for liquid crystal display. OLED is short for organic light-emitting diode.

In the embodiments shown in FIG. 1 and FIG. 2, the electrochromic combination layer 22 may be disposed on the toughened glass 21 in a physical vapor deposition (PVD) manner. Specifically, in a physical vapor deposition technology, a material of the electrochromic combination layer 22 is vaporized into a gaseous atom in a vacuum condition by using a physical method, the gaseous atom is deposited as a film on a surface of the toughened glass 21, and the film finally forms the electrochromic combination layer 22. Certainly, a manner of disposing the electrochromic combination layer 22 on the toughened glass 21 is not limited to physical vapor deposition, and another manner may also be used.

Figure 3:
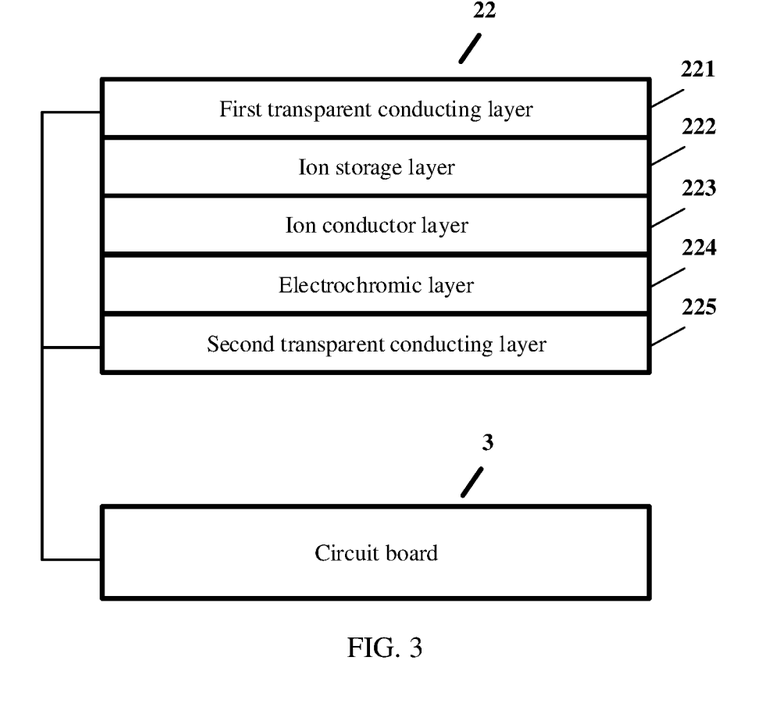
FIG. 3 is a schematic diagram of a specific structure of an electrochromic combination layer 22 in FIG. 2.

FIG. 3 is a schematic diagram of a specific structure of an electrochromic combination layer 22 in FIG. 2. FIG. 3 shows only a specific structure of the electrochromic combination layer 22. Certainly, the electrochromic combination layer 22 is not limited to the structure shown in FIG. 3, and may alternatively be another type of structure. The electrochromic combination layer 22 shown in FIG. 3 includes a first transparent conducting layer 221, an ion storage layer 222, an ion conductor layer 223, an electrochromic layer 224, and a second transparent conducting layer 225 that are sequentially stacked. Both the first transparent conducting layer 221 and the second transparent conducting layer 225 are electrically connected to the circuit board 3.

In the embodiments shown in FIG. 1 to FIG. 3, an initial state of the electrochromic layer 224 is the transparent state. When the first transparent conducting layer 221 receives a voltage provided by the circuit board 3, a first ion stored at the ion storage layer 222 enters the electrochromic layer 224 through the ion conductor layer 223. When the electrochromic layer 224 receives the first ion, the electrochromic layer 224 switches from the transparent state to the target color. When the electrochromic layer 224 is in the target color and the first transparent conducting layer 221 receives no voltage provided by the circuit board 3, the electrochromic layer 224 remains in the target color. When the electrochromic layer 224 is in the target color and the second transparent conducting layer 225 receives a voltage provided by the circuit board 3, the first ion at the electrochromic layer 224 returns to the ion storage layer 222 through the ion conductor layer 223, and the electrochromic layer 224 switches from the target color to the transparent state. When the electrochromic layer 224 is in the transparent state and neither the first transparent conducting layer 221 nor the second transparent conducting layer 225 receives a voltage provided by the circuit board 3, the electrochromic layer 224 remains in the transparent state. As can be learned from a working principle of the electrochromic combination layer 22, the electrochromic layer 224 can display the target color while consuming less power, and can further restore to the transparent state while consuming less power.

In the embodiments shown in FIG. 1 to FIG. 3, the first transparent conducting layer 221 and the second transparent conducting layer 225 may be specifically AZO. AZO is short for aluminum-doped zinc oxide (ZnO) transparent conductive glass. The ion storage layer 222 may be specifically vanadium pentoxide ($V_2O_5$). The ion conductor layer 223 may be specifically lithium tantalate (LiTa03).

Figure 4:
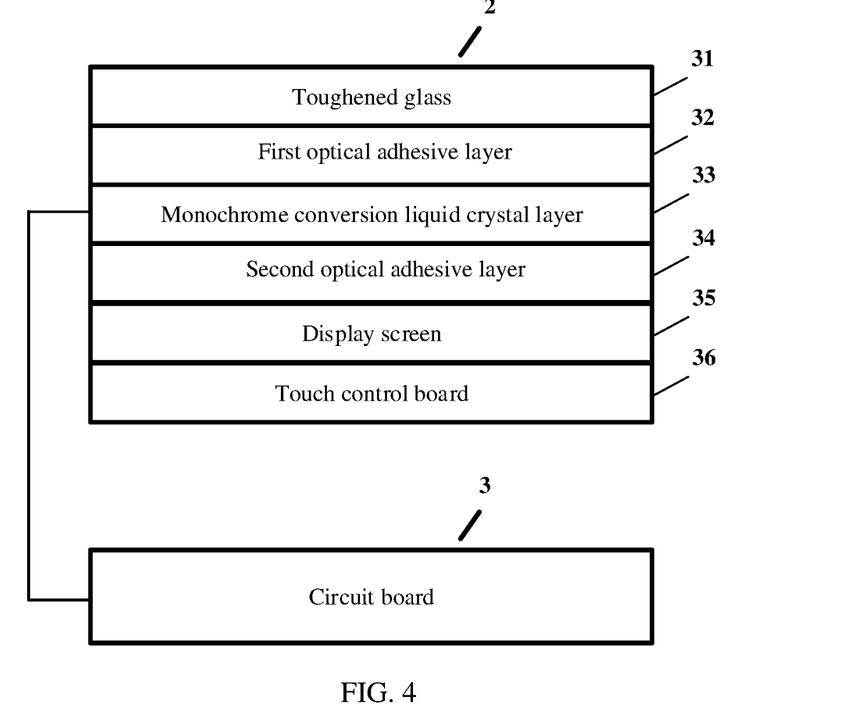
FIG. 4 is a schematic diagram of another front screen according to an embodiment of this application.

FIG. 4 is a schematic diagram of another front screen according to an embodiment of this application. In the embodiments shown in FIG. 1 and FIG. 4, the front screen 2 includes a toughened glass 31, a first optical adhesive layer 32, a monochrome conversion liquid crystal layer 33, a second optical adhesive layer 34, a display screen 35, and a touch control board 36 that are sequentially stacked. The monochrome conversion liquid crystal layer 33 is electrically connected to the circuit board 3, and is configured to change a color when receiving power supply from the circuit board 3.

In the embodiments shown in FIG. 1 and FIG. 4, the toughened glass 31 can increase strength of the front screen, to protect security of the monochrome conversion liquid crystal layer 33, the display screen 35, and the touch control board 36. The monochrome conversion liquid crystal layer 33 may switch between the transparent state and the target color. The first optical adhesive layer 32 may bond the toughened glass 31 to the monochrome conversion liquid crystal layer 33. The second optical adhesive layer 34 may bond the monochrome conversion liquid crystal layer 33 to the display screen 35. The display 35 may display an image. The touch control board 36 may receive a touch instruction entered by a user.

In the embodiments shown in FIG. 1 and FIG. 4, when the monochrome conversion liquid crystal layer 33 receives no voltage provided by the circuit board 3, the monochrome conversion liquid crystal layer 33 is in the transparent state. When the monochrome conversion liquid crystal layer 33 receives a voltage provided by the circuit board 3, the monochrome conversion liquid crystal layer 33 switches from the transparent state to the target color. As can be learned from a working principle of the monochrome conversion liquid crystal layer 33, the monochrome conversion liquid crystal layer 33 can switch only between the target color and the transparent state. Because the color to be displayed by the monochrome conversion liquid crystal layer 33 is a single color, the monochrome conversion liquid crystal layer 33 consumes less power, and the monochrome conversion liquid crystal layer 33 can display the target color while consuming less power, and can further restore to the transparent state while consuming no power.

In the embodiments shown in FIG. 1 and FIG. 4, the display screen 25 may be a screen such as an LCD or an OLED. In addition, to prevent an overall thickness of the front screen 2 from being excessively large, a thickness of the monochrome conversion liquid crystal layer 33 may be controlled within 0.1 millimeters.

Figure 5:
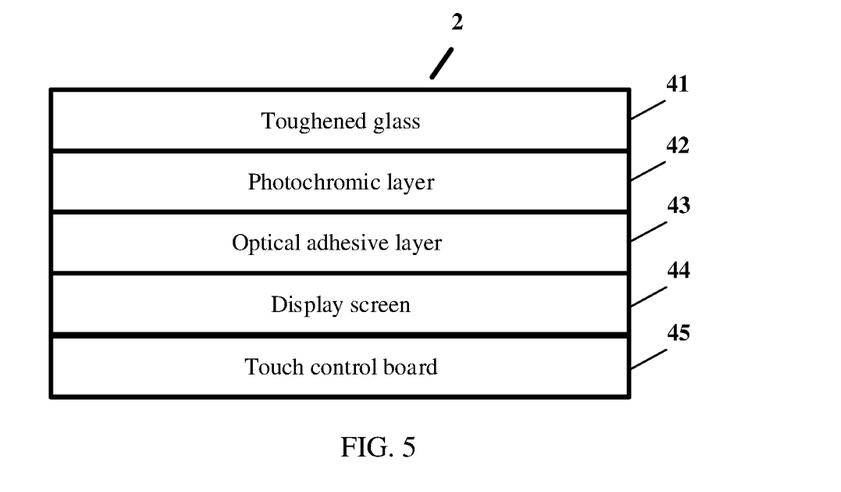
FIG. 5 is a schematic diagram of still another front screen according to an embodiment of this application.

FIG. 5 is a schematic diagram of still another front screen according to an embodiment of this application. The front screen shown in FIG. 5 includes a toughened glass 41, a photochromic layer 42, an optical adhesive layer 43, a display screen 44, and a touch control board 45 that are sequentially stacked. Light emitted by the display screen 44 may be irradiated onto the photochromic layer 42, and the photochromic layer 42 is configured to change a color when receiving the light emitted by the display screen 44.

In the embodiments shown in FIG. 1 and FIG. 5, the toughened glass 41 can increase strength of the front screen, to protect security of the photochromic layer 42, the display screen 44, and the touch control board 45. The photochromic layer 42 may switch between the transparent state and the target color. The photochromic layer 42 may comprise a photosensitive material, for example, photosensitive ink. The optical adhesive layer 43 may bond the photochromic layer 42 to the display screen 44. The display screen 44 may display an image. The touch control board 45 may receive a touch instruction entered by a user.

In the embodiments shown in FIG. 1 and FIG. 5, when the photochromic layer 42 receives no light emitted by the display screen 44, the photochromic layer 42 is in a target color. When the photochromic layer 42 is in the target color and the photochromic layer 42 receives the light emitted by the display screen 44, the photochromic layer 42 switches from the target color to a transparent state. As can be learned from a working principle of the photochromic layer 42, when the photochromic layer 42 receives the light emitted by the display screen 44, the photochromic layer 42 may switch from the transparent state to the target color. In addition, when the photochromic layer 42 receives no light emitted by the display screen 44, the photochromic layer 42 may switch from the target color to the transparent state. In a process of switching between the transparent state and the target color, the photochromic layer 42 consumes no power.

In the embodiments shown in FIG. 1 and FIG. 5, the display screen 44 may be a screen such as an LCD or an OLED. In addition, to prevent an overall thickness of the front screen 2 from being excessively large, a thickness of the photochromic layer 42 may be controlled within 0.05 millimeters.

In the embodiments shown in FIG. 1 and FIG. 5, the photochromic layer 42 may be disposed on the toughened glass 41 in a physical vapor deposition manner. Specifically, in a physical vapor deposition technology, a material of the photochromic layer 42 is vaporized into a gaseous atom in a vacuum condition by using a physical method, the gaseous atom is deposited as a film on a surface of the toughened glass 41, and the film finally forms the photochromic layer 42. Certainly, a manner of disposing the photochromic layer 42 on the toughened glass 41 is not limited to physical vapor deposition, and another manner may also be used.

In the embodiments shown in FIG. 1 to FIG. 5, the target color may be one color. For example, the target color may be a single color such as red, yellow, or green. Alternatively, the target color may be a color obtained by combining several colors. For example, the target color may be a gradient color obtained by combining colors such as red, yellow, or green.

Figure 6:
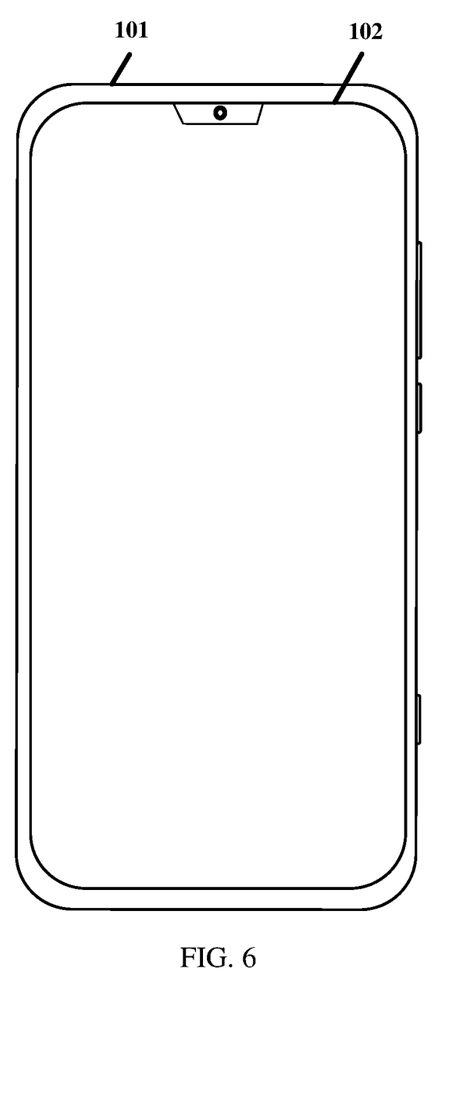
FIG. 6 is a schematic diagram of a mobile terminal according to an embodiment of this application.

FIG. 6 is a schematic diagram of a mobile terminal according to an embodiment of this application. The mobile terminal shown in FIG. 6 includes a housing 101, a front screen 102, a circuit board, and a power supply. The circuit board and the power supply are not shown in FIG. 6. The front screen 102 is disposed on the housing 101, both the circuit board and the power supply are disposed inside the housing 101, and the power supply is electrically connected to the circuit board. The front screen 102 may be the front screen 2 in the embodiments shown in FIG. 1 to FIG. 5. For description of the front screen 102, refer to the description of the front screen 2 in the embodiments shown in FIG. 1 to FIG. 5.

In the embodiment shown in FIG. 6, the housing 101 may include a middle frame and a rear cover, and the front screen 102 and the rear cover are separately fastened on two sides of the middle frame.

With reference to FIG. 2 and FIG. 6, if a specific structure of the front screen 102 shown in FIG. 6 is shown in FIG. 2, the front screen 102 includes the toughened glass 21, the electrochromic combination layer 22, the silicon dioxide layer 23, the optical adhesive layer 24, the display screen 25, and the touch control board 26 that are sequentially stacked.

The following describes the embodiments shown in FIG. 2 and FIG. 6 with reference to specific application scenarios. For example, it is assumed that the mobile terminal is a smartphone. The smartphone includes the housing 101, the front screen 102, the circuit board, and the power supply shown in FIG. 6. A specific structure of the front screen 102 is the structure shown in FIG. 2. It is assumed that the housing 101 of the smartphone is blue. When the display screen 25 is in an on state, the electrochromic combination layer 22 is in the transparent state. When the display screen 25 is in an off state, the circuit board of the smartphone applies a voltage to the first end of the electrochromic combination layer 22, and the electrochromic combination layer 22 switches from the transparent state to the blue color, so that the color of the front screen 102 is the same as that of the housing 101. When the electrochromic combination layer 22 is blue and the electrochromic combination layer 22 receives no voltage provided by the circuit board, the electrochromic combination layer 22 remains in the blue color. Therefore, the electrochromic combination layer 22 consumes no additional electricity. When the display screen 25 is in the on state, the circuit board of the smartphone applies a voltage to the second end of the electrochromic combination layer 22, and the electrochromic combination layer 22 switches from the blue color to the transparent state, so that the front screen 102 presents only an image displayed on the display screen 25. Therefore, the front screen 102 can display the blue color while consuming less power, and is consistent with the housing 101. In addition, the front screen 102 can further restore to the transparent state while consuming less power.

With reference to FIG. 4 and FIG. 6, if a specific structure of the front screen 102 shown in FIG. 6 is shown in FIG. 4, the front screen 102 includes the toughened glass 31, the first optical adhesive layer 32, the monochrome conversion liquid crystal layer 33, the second optical adhesive layer 34, the display screen 35, and the touch control board 36 that are sequentially stacked.

The following describes the embodiments shown in FIG. 4 and FIG. 6 with reference to specific application scenarios. For example, it is assumed that the mobile terminal is a smartphone. The smartphone includes the housing 101, the front screen 102, the circuit board, and the power supply shown in FIG. 6. A specific structure of the front screen 102 is the structure shown in FIG. 4. It is assumed that the housing 101 of the smartphone is blue. When the display screen 35 is in an on state, the monochrome conversion liquid crystal layer 33 is in the transparent state. When the display screen 35 is in an off state, the circuit board of the smartphone applies a voltage to the monochrome conversion liquid crystal layer 33, and the monochrome conversion liquid crystal layer 33 switches from the transparent state to the blue color, so that the color of the front screen 102 is the same as that of the housing 101. When the display screen 35 is in the on state, the circuit board of the smartphone stops applying a voltage to the monochrome conversion liquid crystal layer 33, and the monochrome conversion liquid crystal layer 33 switches from the blue color to the transparent state, so that the front screen 102 presents only an image displayed on the display screen 35. Therefore, because the color to be displayed by the monochrome conversion liquid crystal layer 33 is a single color, the monochrome conversion liquid crystal layer 33 consumes less power. Therefore, the front screen 102 can display the blue color while consuming less power, and is consistent with the housing 101. In addition, the front screen 102 can further restore to the transparent state while consuming no power.

With reference to FIG. 5 and FIG. 6, if a specific structure of the front screen 102 shown in FIG. 6 is shown in FIG. 5, the front screen 102 includes the toughened glass 41, the photochromic layer 42, the optical adhesive layer 43, the display screen 44, and the touch control board 45 that are sequentially stacked.

The following describes the embodiments shown in FIG. 5 and FIG. 6 with reference to specific application scenarios. For example, it is assumed that the mobile terminal is a smartphone. The smartphone includes the housing 101, the front screen 102, the circuit board, and the power supply shown in FIG. 6. A specific structure of the front screen 102 is the structure shown in FIG. 5. It is assumed that the housing 101 of the smartphone is blue. When the display screen 44 is in an off state, the photochromic layer 42 cannot receive light sent by the display screen 44, and is in a target color. When the display screen 44 is in an on state, the photochromic layer 42 receives light sent by the display screen 44, and switches from the blue color to the transparent state. Therefore, the front screen 102 can display the blue color while consuming no power, and is consistent with the housing 101. In addition, the front screen 102 can further restore to the transparent state while consuming no power.

Figure 7:
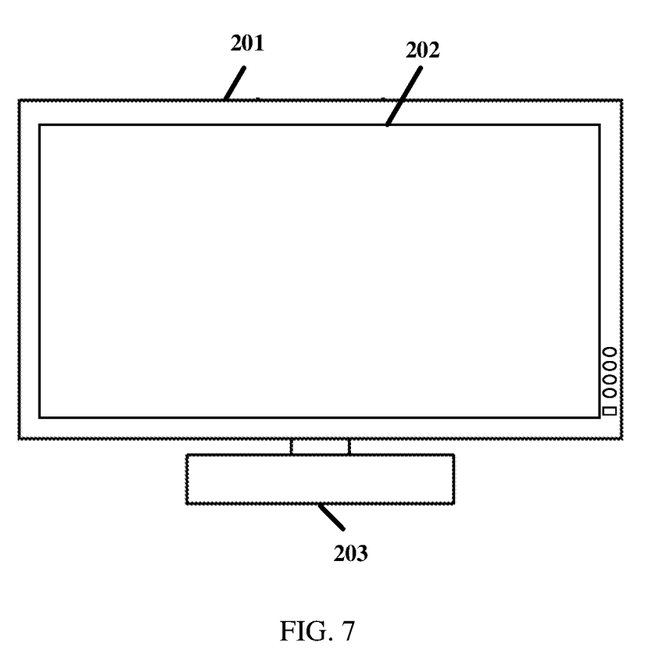
FIG. 7 is a schematic diagram of a display according to an embodiment of this application.

FIG. 7 is a schematic diagram of a display according to an embodiment of this application. The display shown in FIG. 7 includes a housing 201, a front screen 202, a bracket 203, a circuit board, and a power supply. The circuit board and the power supply are not shown in FIG. 7. The front screen 202 is disposed on the housing 201, the bracket 203 is connected to the housing 201, and colors of the housing 201 and the bracket 203 are a target color. The front screen 202 may be the front screen in the embodiments shown in FIG. 1 to FIG. 5. For description of the front screen 202, refer to the description of the front screen in the embodiments shown in FIG. 1 to FIG. 5.

Figure 8:
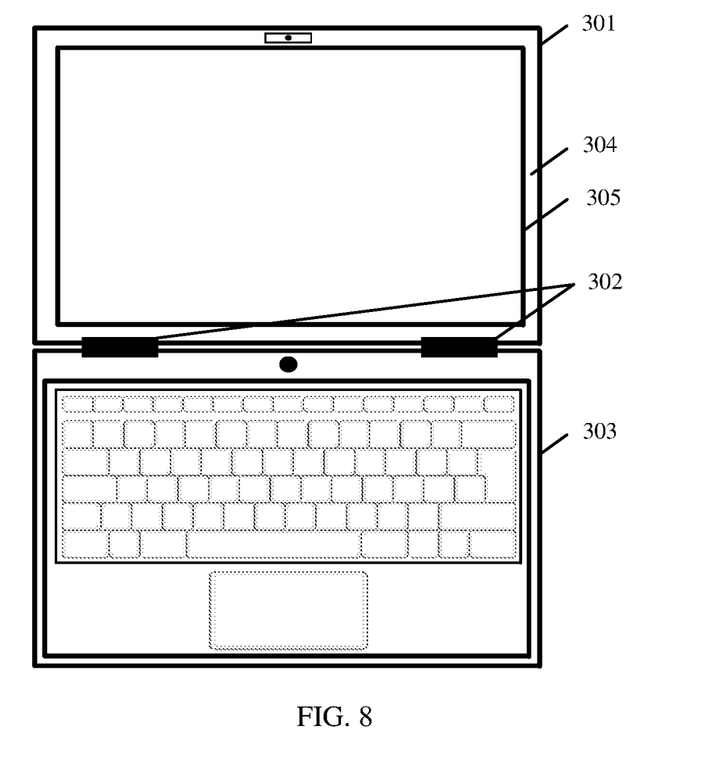
FIG. 8 is a schematic diagram of a notebook computer according to an embodiment of this application.

FIG. 8 is a schematic diagram of a notebook computer according to an embodiment of this application. The notebook computer shown in FIG. 8 includes a display device 301, a connection component 302, a host 303, a circuit board, and a power supply. The circuit board and the power supply are not shown in FIG. 8. The display device 301 is connected to the host 303 by using the connection component 302, and includes a housing 304 and a front screen 305 disposed on the housing 304. The circuit board and the power supply are disposed inside the host 303. Colors of the housing 304, the connection component 302, and the host 303 are a target color. The front screen 305 may be the front screen in the embodiments shown in FIG. 1 to FIG. 5. For description of the front screen 305, refer to the description of the front screen in the embodiments shown in FIG. 1 to FIG. 5.

Figure 9:
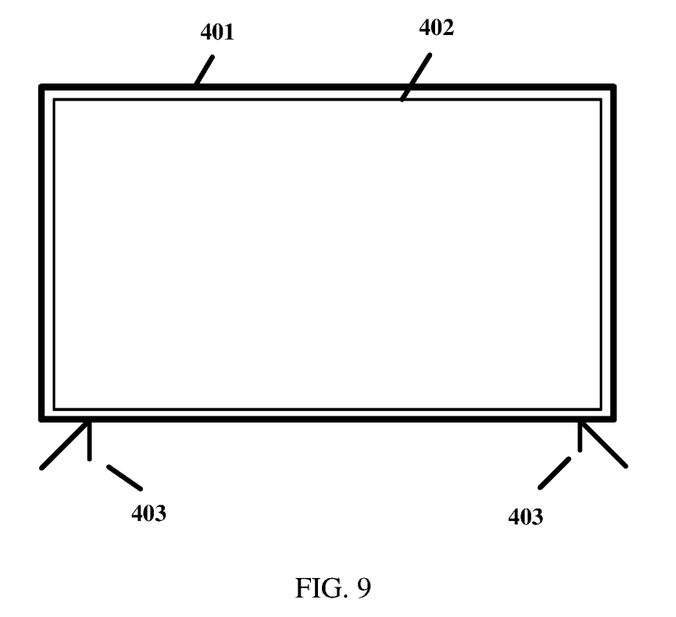
FIG. 9 is a schematic diagram of a smart television according to an embodiment of this application.
Figure 10:
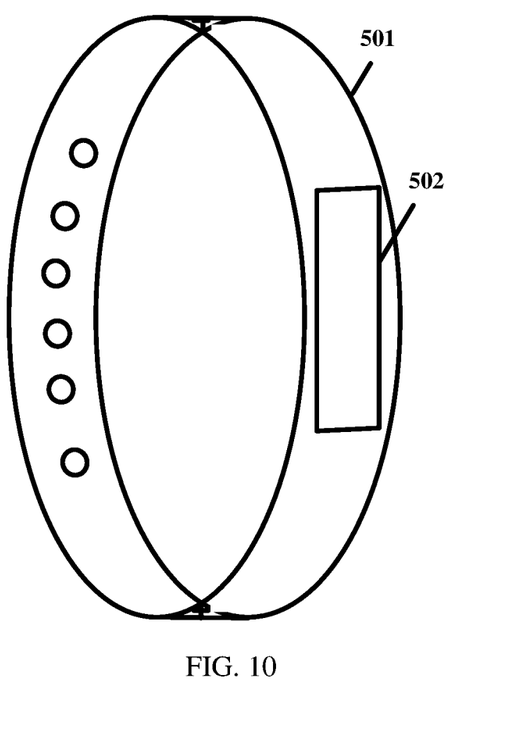
FIG. 10 is a schematic diagram of a wearable device according to an embodiment of this application.

FIG. 9 is a schematic diagram of a smart television according to an embodiment of this application. The smart television shown in FIG. 9 includes a housing 401, a front screen 402, a bracket 403, a circuit board, and a power supply. The circuit board and the power supply are not shown in FIG. 9. The front screen 402 is disposed on the housing 401, the bracket 403 is connected to the housing 401, the circuit board and the power supply are disposed inside the housing 401, and colors of the housing 401 and the bracket 403 are a target color. The front screen 402 may be the front screen in the embodiments shown in FIG. 1 to FIG. 5. For description of the front screen 402, refer to the description of the front screen in the embodiments shown in FIG. 1 to FIG. 5.

What is claimed is:

1. A terminal, comprising a housing, a front screen, a circuit board, and a power supply, wherein
   the front screen is disposed on the housing, both the circuit board and the power supply are disposed inside the housing, and the power supply is electrically connected to the circuit board;
   the front screen comprises a toughened glass, a color changing layer, and a display screen that are sequentially stacked; and
   the color changing layer is electrically connected to the circuit board, and is configured to remain in a transport state when receiving no voltage from the circuit board and change to present a target color when receiving a voltage supplied from the circuit board.

2. The terminal according to claim 1, wherein the color changing layer is an electrochromic combination layer;
   the electrochromic combination layer comprises a first transparent conducting layer, an ion storage layer, an ion conductor layer, an electrochromic layer, and a second transparent conducting layer that are sequentially stacked; and
   both the first transparent conducting layer and the second transparent conducting layer are electrically connected to the circuit board.

3. The terminal according to claim 2, wherein the front screen further comprises a silicon dioxide layer, an optical adhesive layer, and a touch control board;
   the first transparent conducting layer of the electrochromic combination layer is fastened on the toughened glass;
   a first surface of the silicon dioxide layer is fastened on the second transparent conducting layer of the electrochromic combination layer;
   a second surface of the silicon dioxide layer is bonded to a first surface of the display screen by using the optical adhesive layer; and
   a second surface of the display screen is attached to the touch control board.

4. The terminal according to claim 2, wherein a thickness of the electrochromic combination layer is less than or equal to 10 micrometers.

5. The terminal according to claim 3, wherein a thickness of the electrochromic combination layer is less than or equal to 10 micrometers.

6. The terminal according to claim 1, wherein the color changing layer is a monochrome conversion liquid crystal layer;
the front screen further comprises a first optical adhesive layer, a second optical adhesive layer, and a touch control board;
a first surface of the monochrome conversion liquid crystal layer is bonded to the toughened glass by using the first optical adhesive layer;
a second surface of the monochrome conversion liquid crystal layer is bonded to a first surface of the display screen by using the second optical adhesive layer; and
a second surface of the display screen is attached to the touch control board.

7. The terminal according to claim 6, wherein a thickness of the monochrome conversion liquid crystal layer is less than or equal to 0.1 millimeters.

8. A terminal, comprising a housing and a front screen, wherein
the front screen is disposed on the housing;
the front screen comprises a toughened glass, a photochromic layer, and a display screen that are sequentially stacked;
the photochromic layer is configured to remain in a transparent state when receiving no light emitted from the display screen; and
the display screen is configured to emit light irradiated onto the photochromic layer, and the photochromic layer is further configured to change to present a target color when receiving the light emitted by the display screen.

9. The terminal according to claim 8, wherein the front screen further comprises an optical adhesive layer and a touch control board;
a first surface of the photochromic layer is fastened on the toughened glass;
a second surface of the photochromic layer is bonded to a first surface of the display screen by using the optical adhesive layer; and
a second surface of the display screen is attached to the touch control board.

10. The terminal according to claim 8, wherein a thickness of the photochromic layer is less than or equal to 0.05 millimeters.

11. The terminal according to claim 9, wherein a thickness of the photochromic layer is less than or equal to 0.05 millimeters.

12. The terminal according to claim 8, wherein the photochromic layer comprises a photosensitive material.

13. The terminal according to claim 9, wherein the photochromic layer comprises a photosensitive material.

14. The terminal according to claim 10, wherein the photochromic layer comprises a photosensitive material.

15. The terminal according to claim 8, wherein the photochromic layer is configured to change from a transparent state to a state of presenting a color of the housing when receiving the light emitted by the display screen so that the color of the front screen is the same as the color of the housing.

16. The terminal according to claim 1, wherein the color changing layer is in a transparent state when the display screen is in an off state.

17. The terminal according to claim 16, wherein the color changing layer is configured to change from the transparent state to a state of presenting a color of the housing when receiving the voltage supplied from the circuit board so that the color of the front screen is the same as the color of the housing.

18. The terminal according to claim 2, wherein an initial state of the electrochromic layer is the transparent state; and
the electrochromic layer is configured to switch from the transparent state to a state of presenting the target color when the electrochromic layer receives an ion stored at the ion storage layer, and the ion enters the electrochromic layer when the first transparent conducting layer receives a voltage from the circuit board.

19. The terminal according to claim 18, wherein the electrochromic layer is further configured to:
remain in presenting the target color when the electrochromic layer is in the state of presenting the target color and the first transparent conducting layer receives no voltage from the circuit board;
switch from the state of presenting the target color to the transparent state when the electrochromic layer is in the state of presenting the target color, the second transparent conducting layer receives a voltage from the circuit board, and the ion at the electrochromic layer returns to the ion storage layer; and
remain in the transparent state when the electrochromic layer is in the transparent state and neither the first transparent conducting layer nor the second transparent conducting layer receives a voltage from the circuit board.

* * * * *

UNITED STATES PATENT AND TRADEMARK OFFICE
CERTIFICATE OF CORRECTION

PATENT NO. : 11,567,382 B2
APPLICATION NO. : 17/477686
DATED : January 31, 2023
INVENTOR(S) : Zhongzhi Tang It is certified that error appears in the above-identified patent and that said Letters Patent is hereby corrected as shown below:

In the Claims

• Column 10, Claim 1, Line 11, change "transport" to "transparent".

Signed and Sealed this
Seventh Day of March, 2023

Katherine Kelly Vidal
*Director of the United States Patent and Trademark Office*